(12) United States Patent
Kuriki et al.

(10) Patent No.: US 8,623,550 B2
(45) Date of Patent: Jan. 7, 2014

(54) SECONDARY BATTERY AND METHOD FOR MANUFACTURING ELECTRODE OF THE SAME

(75) Inventors: Kazutaka Kuriki, Kanagawa (JP); Tamae Moriwaka, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 352 days.

(21) Appl. No.: 13/044,172

(22) Filed: Mar. 9, 2011

(65) Prior Publication Data

US 2011/0236753 A1    Sep. 29, 2011

(30) Foreign Application Priority Data

Mar. 26, 2010 (JP) ................................. 2010-073345

(51) Int. Cl.
*H01M 4/13* (2010.01)
(52) U.S. Cl.
USPC ................... 429/218.1; 429/209; 429/233
(58) Field of Classification Search
None
See application file for complete search history.

(56) References Cited

U.S. PATENT DOCUMENTS

| | | | |
|---|---|---|---|
| 6,242,132 B1 * | 6/2001 | Neudecker et al. | ......... 429/218.1 |
| 6,685,804 B1 | 2/2004 | Ikeda et al. | |
| 6,887,511 B1 | 5/2005 | Shima et al. | |
| 7,141,187 B2 | 11/2006 | Kosuzu et al. | |
| 7,153,611 B2 * | 12/2006 | Minami et al. | ................. 429/304 |
| 7,192,673 B1 * | 3/2007 | Ikeda et al. | .................... 429/209 |
| 7,195,842 B1 | 3/2007 | Fujimoto et al. | |
| 7,235,330 B1 | 6/2007 | Fujimoto et al. | |
| 7,241,533 B1 * | 7/2007 | Ikeda et al. | ................... 429/233 |
| 7,316,792 B2 | 1/2008 | Kosuzu et al. | |
| 7,410,728 B1 | 8/2008 | Fujimoto et al. | |
| 7,794,881 B1 | 9/2010 | Fujimoto et al. | |
| 7,803,290 B2 | 9/2010 | Kosuzu et al. | |
| 2001/0016281 A1 | 8/2001 | Ito | |
| 2008/0020281 A1 * | 1/2008 | Kogetsu et al. | ............ 429/231.5 |
| 2008/0135801 A1 | 6/2008 | Kizaki et al. | |

FOREIGN PATENT DOCUMENTS

| | | |
|---|---|---|
| JP | 2001-176545 | 6/2001 |
| JP | 2003-077529 | 3/2003 |
| JP | 2004-171904 | 6/2004 |
| JP | 2004-281317 | 10/2004 |
| JP | 2010-282957 | 12/2010 |

OTHER PUBLICATIONS

Zhou et al., Nano Letters 2010, 10 860-863, Published on Web Feb. 11, 2010), Si/TiSi2 Heteronanostructures as High Capacity Anode Material for Li Ion Batteries.*
International Search Report (Application No. PCT/JP2011/055170; PCT13362) Dated May 10, 2011.
Written Opinion (Application No. PCT/JP2011/055170; PCT13362) Dated May 10, 2011.

* cited by examiner

*Primary Examiner* — Patrick Ryan
*Assistant Examiner* — Jose Colucci Rios
(74) *Attorney, Agent, or Firm* — Nixon Peabody LLP; Jeffrey L. Costellia (57) ABSTRACT

Provided is a secondary battery including an electrode including silicon or a silicon compound. The electrode includes, for example, a current collector formed using metal and a silicon film as an active material provided over the current collector. The hydrogen concentration in the silicon film of the electrode may be higher than or equal to $1.0 \times 10^{18}$ cm$^{-3}$ and lower than or equal to $1.0 \times 10^{21}$ cm$^{-3}$. Such a silicon film is formed over a current collector by a plasma CVD method or the like for example, and hydrogen is contained as little as possible in the silicon film, which is preferable. In order to contain hydrogen as little as possible in the silicon film, the silicon film may be formed over the current collector under a high temperature environment.

14 Claims, 9 Drawing Sheets

SECONDARY BATTERY AND METHOD FOR MANUFACTURING ELECTRODE OF THE SAME

TECHNICAL FIELD

A technical field relates to a secondary battery and a method for manufacturing an electrode of the secondary battery.

BACKGROUND ART

In recent years, with the advance of environmental technology, development of power generation devices (e.g., solar power generation devices) which pose less burden on the environment than conventional power generation methods has been actively conducted. Concurrently with the development of power generation technology, development of power storage device has also been underway.

As an example of a power storage device, a lithium ion battery which is a secondary battery can be given. A lithium ion battery is widely prevalent since energy density thereof is high and the lithium ion battery is well suited for miniaturization. As an electrode material of a lithium ion battery, a material in/from which lithium ions can be inserted and extracted is preferably used. Examples thereof include graphite and silicon. Silicon is particular expected to be a host material of lithium because theoretical capacity of silicon is ten times as high as that of graphite.

However, there is a problem in a secondary battery whose electrode includes silicon or a silicon compound, in that charge-discharge cycle characteristics and storage characteristics are not sufficient when $LiPF_6$, $LiBF_4$, $LiAsF_6$, or the like is used as an electrolyte. In Patent Document 1, is disclosed a secondary battery in which charge-discharge cycle characteristics and storage characteristics are sufficiently obtained by setting the concentration of at least one kind of those electrolytes to lower than $0.1$ mol·dm$^{-3}$.

REFERENCE

Patent Document

[Patent Document 1] Japanese Published Patent Application No. 2001-176545

DISCLOSURE OF INVENTION

An object of one embodiment of the present invention is to provide a secondary battery having excellent charge-discharge cycle characteristics.

In particular, an object of one embodiment of the present invention is to provide a secondary battery having excellent charge-discharge cycle characteristics without a reduction in the concentration of $LiPF_6$, $LiBF_4$, $LiAsF_6$, or the like included in an electrolyte (i.e., the concentration thereof can be maintained).

Further, another object of one embodiment of the present invention is to manufacture an electrode of the secondary battery by a simplified manufacturing process.

One embodiment of the present invention is a secondary battery including an electrode including silicon or a silicon compound, and the hydrogen concentration in the electrode is higher than or equal to $1.0 \times 10^{18}$ cm$^{-3}$ and lower than or equal to $1.0 \times 10^{21}$ cm$^{-3}$. That is, the concentration of hydrogen in the electrode which includes silicon or a silicon compound is reduced.

In a secondary battery, it is preferable that an electrode including silicon or a silicon compound include, for example, a current collector comprising metal and a silicon film provided as an active material over the current collector. The hydrogen concentration in the silicon film of the electrode may be higher than or equal to $1.0 \times 10^{18}$ cm$^{-3}$ and lower than or equal to $1.0 \times 10^{21}$ cm$^{-3}$.

Note that in the case where silicon is used as an active material, a silicon film may be formed over the current collector by a plasma CVD method or the like, for example. In this case, it is preferable that hydrogen be contained in the silicon film as little as possible. In order to prevent hydrogen from being contained in the silicon film as much as possible, the silicon film may be formed over the current collector under a high temperature environment.

That is, another embodiment of the present invention is a method for manufacturing an electrode of a secondary battery including the steps of: forming a current collector; and forming a silicon film over the current collector by a plasma CVD method or the like while heating the current collector.

Here, the heating of the current collector is performed at a temperature where hydrogen is less likely to enter the silicon film when the silicon film is formed by a plasma CVD method or the like. The preferable temperature of heating is higher than or equal to 500° C. and a temperature at which composition and a shape of the current collector are not changed.

Here, the hydrogen concentration in the silicon film is preferably higher than or equal to $1.0 \times 10^{18}$ cm$^{-3}$ and lower than or equal to $1.0 \times 10^{21}$ cm$^{-3}$.

According to one embodiment of the present invention, a secondary battery having excellent charge-discharge characteristics without variation of the concentration of an electrolyte can be provided. Moreover, the secondary battery can be manufactured by a simplified process.

BEST MODE FOR CARRYING OUT THE INVENTION

Embodiment and Example of the present invention will be described below with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiment.

In this embodiment, a secondary battery which is one embodiment of the present invention will be described with reference to the drawings.

Figure 1:
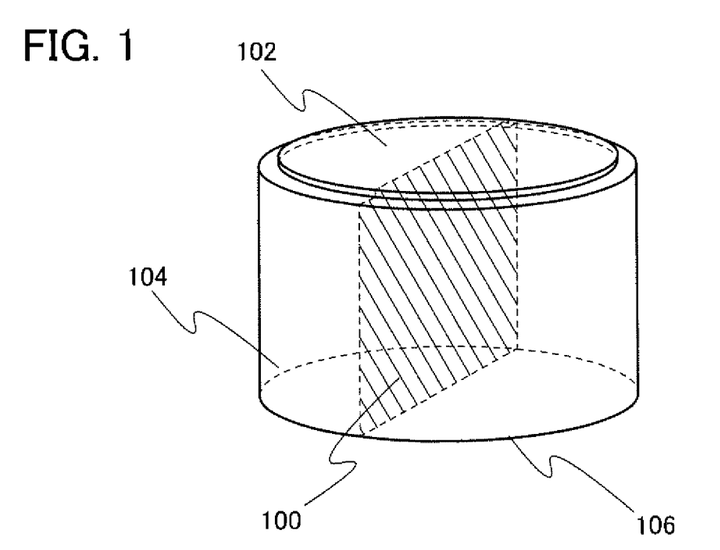
FIG. 1 is a perspective view illustrating an example of a cylindrical secondary battery according to one embodiment of the present invention.

FIG. 1 is a perspective view schematically illustrating an example of a cylindrical secondary battery according to one embodiment of the present invention. Note that the secondary battery of one embodiment of the present invention is not limited thereto, and it may be a square secondary battery. Alternatively, one embodiment of the present invention may be a coin secondary battery.

The cylindrical secondary battery in FIG. 1 has a closed space surrounded by a battery sidewall 104, a battery cover 102, and a battery bottom 106.

Figure 2:
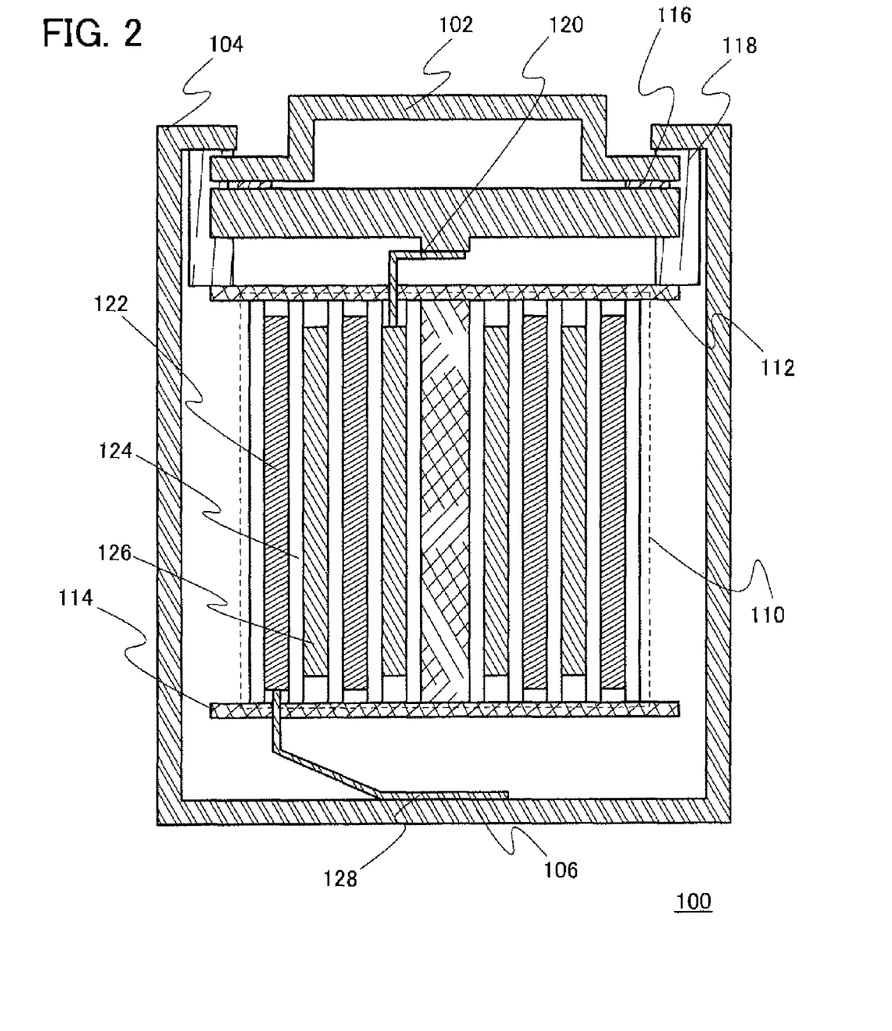
FIG. 2 is a cross-sectional view taken along a cross section 100 of the cylindrical secondary battery in FIG. 1.

FIG. 2 is a cross-sectional view taken along a cross section 100 of the cylindrical secondary battery in FIG. 1.

The battery sidewall 104 and the battery bottom 106 may be formed using a conductive material, and a material thereof may be selected as appropriate so that the battery sidewall 104 and the battery bottom 106 can have sufficient mechanical strength and chemical resistance under the usage environment. Examples of such a material include an aluminum alloy. The closed space surrounded by the battery sidewall 104, the battery bottom 106, and the battery cover 102 is provided in the battery. In the closed space, an electrode body 110 is provided, for example. A wound electrode body is illustrated as an example of the electrode body 110 in FIG. 2; however, the electrode body is not limited to this.

The electrode body 110 is sandwiched between an insulating plate 112 provided on an upper portion (on the battery cover 102 side) and an insulating plate 114 provided on a lower portion (on the battery bottom 106 side). A conductive wire 120 and a conductive wire 128 are drawn out from the insulating plate 112 and the insulating plate 114, respectively. The conductive wire 120 drawn out from the insulating plate 112 on the upper portion (on the battery cover 102 side) is preferably connected to the battery cover 102 electrically through a resistor 116. As the resistor 116, a heat sensitive resistor whose resistance increases with the rise in the temperature is preferably used for preventing abnormal heat generation due to excessive current flow. The conductive wire 128 drawn out from the insulating plate 114 on the lower portion (on the battery bottom 106 side) is connected to the battery bottom 106. Note that the battery bottom 106 and the battery sidewall 104 are electrically connected to each other.

The battery sidewall 104, the battery cover 102, and the insulating plate 112 on the upper portion (the battery cover 102 side) of the electrode body 110 are preferably provided to be connected to each other with a gasket 118. It is preferable that the gasket 118 be an insulator, but it is not limited thereto. Any kinds of gasket can be used as long as at least the battery cover 102 and the battery sidewall 104 are insulated from each other.

Although not illustrated, a safety valve may be provided inside the battery in order to disconnect electrical connection between the battery cover 102 and the electrode body 110 in the case where short-circuit occurs between a negative electrode 122 and a positive electrode 126 (an electrode whose polarity is opposite to that of the negative electrode 122) or in the case where pressure in the battery is increased by heating of the battery.

Note that a center pin may be provided in the center of the electrode body 110 to fix the electrode body 110.

The electrode body 110 includes the negative electrode 122, the positive electrode 126, and a separator 124 which is provided between the negative electrode 122 and the positive electrode 126. The negative electrode 122 included in the electrode body 110 is electrically connected to the battery bottom 106 through the conductive wire 128. The positive electrode 126 included in the electrode body 110 is electrically connected to the battery cover 102 through the conductive wire 120.

The positive electrode 126 includes a positive electrode current collector and positive electrode active material layers which are provided on both sides of the positive electrode current collector. Note that the positive electrode active material layer may be provided on only one side of the positive electrode current collector.

The positive electrode active material layer includes a material in/from which an ion which is an electrode reactive material can be inserted and extracted. An ion giving/receiving electric charge may be an alkali metal ion or an alkaline earth metal ion.

A lithium ion is preferably used as an ion giving/receiving electric charge.

Examples of such a material in/from which an ion can be inserted and extracted include silicon.

A positive electrode active material layer in which silicon is used as a positive electrode active material can be formed to be thin, which enables a reduction in size and weight. For example, as compared to the case where graphite is used as the positive electrode active material, the thickness of the positive electrode active material layer including silicon can be reduced to about one tenth. Even when the positive electrode active material layer is not formed to be thin, capacity of the secondary battery can be increased.

Further, as a current collector, a titanium film or the like may be formed by a sputtering method over a substrate such as a glass substrate or a plastic substrate, and a silicon film as an active material layer may be formed over the titanium film by a plasma CVD method or the like. In this case, it is preferable that hydrogen be contained as little as possible in a source gas for formation of the silicon film.

Here, a method for forming an electrode over a substrate is described with reference to FIGS. 3A to 3C.

Figure 3A:
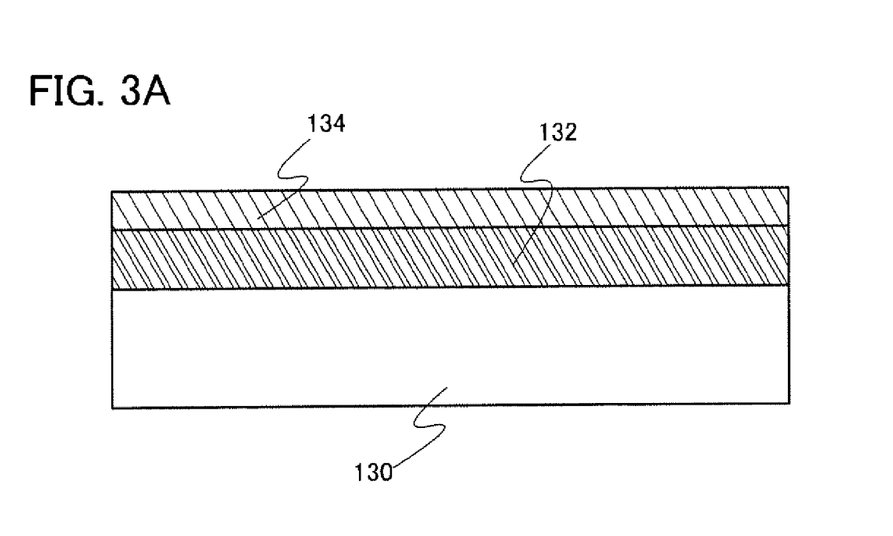
FIGS. 3A to 3C illustrate an example of a manufacturing method of an electrode of a secondary battery according to one embodiment of the present invention.

First, a current collector layer 132 is formed over a substrate 130, and an active material layer 134 is formed over the current collector layer 132 (FIG. 3A). For example, with use of a glass substrate as the substrate 130, the film formation may be performed as follows: the substrate 130 is transported into a reaction chamber; a titanium layer to be the current collector layer 132 is formed over the substrate 130 by a sputtering method; and an amorphous silicon layer containing phosphorus to be the active material layer 134 is formed over the current collector layer 132 by a plasma CVD method. The active material layer 134 can be formed to be thin as described above; however, excessive thin layer causes a decrease in capacity of a secondary battery. Thus, the active material layer 134 is formed to a thickness greater than or equal to 50 nm and less than or equal to 10 μm, preferably greater than or equal to 100 nm and less than or equal to 5 μm.

Note that as the substrate 130, for example, a metal substrate having higher conductivity than a material of the current collector layer 132 is preferably used.

Figure 3B:
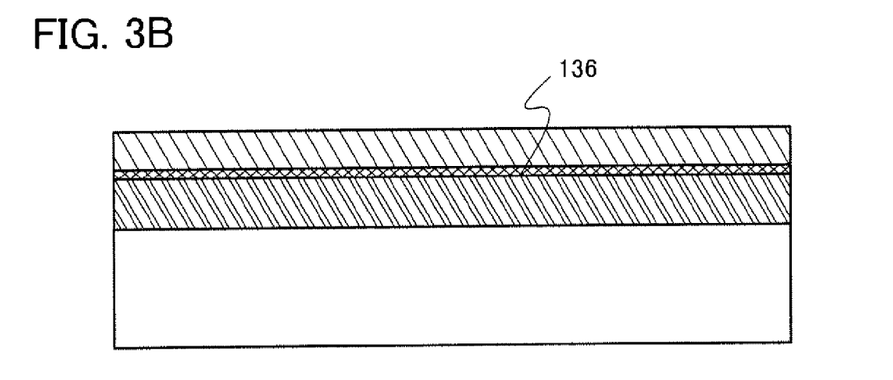

Next, the substrate 130 is subjected to heat treatment, whereby a mixed layer 136 containing a material of the current collector layer 132 and a material of the active material layer 134 is formed between the current collector layer 132 and the active material layer 134 (FIG. 3B). For example, as the mixed layer 136, a layer in which titanium and silicon are mixed may be formed. Note that the mixed layer of titanium and silicon may be a titanium silicide layer.

Figure 3C:
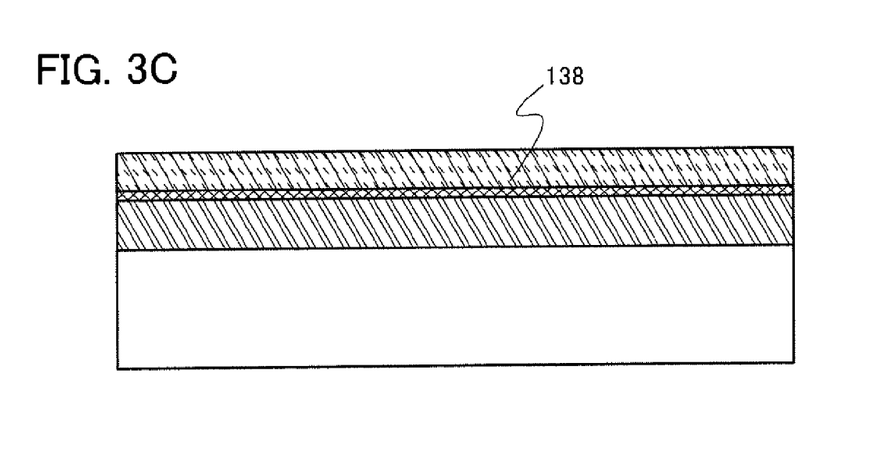

Next, lithium is introduced into the active material layer 134 or both the active material layer 134 and the mixed layer 136, so that a lithium-containing layer 138 is formed (FIG. 3C). Here, in order to introduce lithium, a doping method may be used.

Note that it is preferable that phosphorus be contained in the silicon film which is formed as the active material layer 134. By containing phosphorus in the silicon film, peeling generated between the titanium film and the silicon film can be prevented. In order to contain phosphorus in the silicon film, phosphine may be contained in a source gas, for example.

After the silicon film is formed over the titanium film, it is preferable that hydrogen in the silicon film be discharged by heating the substrate 130 or the like. The temperature for heating the substrate may be higher than or equal to 500° C., at which composition and shape of the current collector are not changed. However, the electrode formation process is not limited thereto, and the heating step is not necessarily performed in the case where the hydrogen concentration in the silicon film is sufficiently reduced.

Note that there is no particular limitation on crystallinity of the silicon film functioning as the active material layer 134. The silicon film may be an amorphous film or a crystalline film. As the silicon film functioning as the active material layer 134, an amorphous silicon film, a microcrystalline silicon film, or a polycrystalline silicon film can be given, for example. A crystallization step may be performed on the silicon film. In the case of performing a crystallization step on the silicon film, after the hydrogen concentration in the silicon film is sufficiently reduced, the silicon film may be subjected to heat treatment to be crystallized, or the silicon film may be irradiated with laser light to be crystallized.

The hydrogen concentration of the silicon film of this embodiment which is formed as described above may be higher than or equal to $1.0 \times 10^{18}$ cm$^{-3}$ and lower than or equal to $1.0 \times 10^{21}$ cm$^{-3}$. With the silicon film having the hydrogen concentration within the above range, charge-discharge cycle characteristics of the secondary battery can be improved.

Note that the mixed layer 136 is not necessarily formed.

The separator 124 may be formed using a porous film impregnated with an electrolyte solution which is a liquid electrolyte. As a material of the porous film, a synthetic resin substance, a ceramic substrate, or the like may be used. As a preferable material of the porous film, polyethylene, polypropylene, or the like may be used.

As the separator 124, paper, a nonwoven fabric, a glass fiber, a synthetic fiber such as nylon (polyamide), vinylon (also called vinalon) (a polyvinyl alcohol based fiber), polyester, acrylic, polyolefin, or polyurethane, or the like can be used. However, a material which does not dissolve in an electrolyte solution should be selected.

As the electrolyte solution with which the separator 124 is impregnated, for example, a mixture in which lithium hexafluorophosphate (compositional formula: LiPF$_6$) is added to a mixed solution of ethylene carbonate (EC) and diethyl carbonate (DEC) may be used. Further, as the electrolyte, lithium chloride (compositional formula: LiCl), lithium fluoride (compositional formula: LiF), lithium perchlorate (compositional formula: LiClO$_4$), lithium fluoroborate (compositional formula: LiBF$_4$), lithium bis(trifluoromethanesulfonyl)imide (compositional formula: LiN(SO$_2$CF$_3$)$_2$), lithium bis(pentafluoroethanesulfonyl)imide (compositional formula: LiN(SO$_2$C$_2$F$_5$)$_2$), lithium trifluoromethansulfonate (compositional formula: LiCF$_3$SO$_3$), or the like can be used. Furthermore, in the case where an alkali metal ion other than a lithium ion is used, sodium chloride (compositional formula: NaCl), sodium fluoride (compositional formula: NaF), sodium perchlorate (compositional formula: NaClO$_4$), sodium fluoroborate (compositional formula: NaBF$_4$), potassium chloride (compositional formula: KCl), potassium fluoride (compositional formula: KF), potassium perchlorate (compositional formula: KClO$_4$), potassium fluoroborate (compositional formula: KBF$_4$), or the like can be used, one or more of which may be dissolved in a solvent.

Besides ethylene carbonate (EC) and diethyl carbonate (DEC), examples of the solvent for the electrolyte solution include: cyclic carbonates such as propylene carbonate (PC), butylene carbonate (BC), and vinylene carbonate (VC); acyclic carbonates such as dimethyl carbonate (DMC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran, 2-methyltetrahydrofuran, and 1,3-dioxolane dimethylsulfoxide; alkyl phosphate esters such as trimethyl phosphate, triethyl phosphate, and trioctyl phosphate; and dimethylsulfoxide, all of which can be used either alone or in combination. Further, hydrogen in the above solvent may be substituted with fluorine.

According to one embodiment of the present invention, by reducing hydrogen in an electrode including silicon, charge-discharge cycle characteristics of the secondary battery can be improved without a reduction in the concentration of an electrolyte in an electrolyte solution (i.e., the concentration of the electrolyte can be maintained).

The described electrode functions as a positive electrode when a material of the opposite electrode is lithium. On the other hand, the described electrode functions as a negative electrode when the opposite electrode is formed using a metal material with higher oxidation-reduction potential than silicon. It is preferable that the negative electrode include a current collector and an active material, as in the positive electrode. For example, a composite oxide layer containing lithium metal which functions as an active material may be formed over the current collector. Note that another alkali metal may be used instead of lithium.

Hereinafter, an example of a positive electrode in the case where the described electrode functions as a negative electrode is described.

As the positive electrode active material, a material including both an ion functioning as a carrier and a transition metal can be used, for example. As an example of the material including an ion functioning as a carrier and a transition metal, a material which is represented by a general formula $A_xM_yPO_Z$ (x>0, y>0, z>0) can be given. Here, A represents an alkali metal such as lithium, sodium, or potassium, or an alkaline earth metal such as beryllium, magnesium, calcium, strontium, or barium. M represents, for example, a transition metal such as iron, nickel, manganese, or cobalt. As the material represented by the general formula $A_xM_yPO_Z$ (x>0, y>0, z>0), lithium iron phosphate, sodium iron phosphate, or the like can be given. Each of the material represented by A and the material represented by M may be selected from one or more of the above materials.

Alternatively, a material which is represented by a general formula $A_xM_yO_Z$ (x>0, y>0, z>0) can be used for the positive electrode active material. Here, A represents an alkali metal such as lithium, sodium, or potassium or an alkaline earth metal such as beryllium, magnesium, calcium, strontium, or barium. M represents, for example, a transition metal such as iron, nickel, manganese, or cobalt. As the material represented by the general formula $A_xM_yO_z$ (x>0, y>0, z>0), lithium cobaltate, lithium manganate, lithium nickelate, or the like can be given. Each of the material represented by A and the material represented by M may be selected from one or more of the above materials.

The positive electrode active material layer may be formed by making the positive electrode active material combined with a conductive agent, a binder, or the like and then applying it over the current collector. Alternatively, the positive electrode active material layer may be formed by a sputtering method or the like. As a material of the positive electrode current collector, titanium, aluminum, or the like can be used.

As described above, a secondary battery which is one embodiment of the present invention can be manufactured. The secondary battery of this embodiment can have excellent charge-discharge cycle characteristics without a reduction in the concentration of an electrolyte (i.e., the concentration of an electrolyte can be maintained). Furthermore, the secondary battery of this embodiment can be manufactured by a simplified process.

Example 1

In this example, a secondary battery which is one embodiment of the present invention was manufactured and characteristics thereof were examined. Examination results will be described. In this example, first, Samples 1 to 3 were manufactured as positive electrodes.

As a positive electrode current collector, high-purity titanium foil was used.

Silicon was used as a positive electrode active material. Here, silicon used in Samples 1 to 3 differed from each other. The high-purity titanium foil used as the positive electrode current collector was formed to a thickness of 100 μm, and each of positive electrode active material layers of Samples 1 to 3 was formed to a thickness of 3 μm.

The positive electrode active material of Sample 1 was amorphous silicon. The amorphous silicon was formed by a plasma CVD method. In formation of the amorphous silicon film by a plasma CVD method, plasma was discharged under the following conditions. A source gas in which the flow rate of silane was 60 sccm and the flow rate of 5 vol % phosphine (diluted with hydrogen) was 20 sccm was introduced into a reaction chamber, and the pressure of the reaction chamber was set to 133 Pa. The temperature of a substrate was set to 280° C. The RF power source frequency was 60 MHz, the pulse frequency of the RF power source was 20 kHz, the duty ratio of the pulse was 70%, and power of the RF power source was 100 W.

The positive electrode active material of Sample 2 was microcrystalline silicon. The microcrystalline silicon was formed by a plasma CVD method. In the formation of the microcrystalline silicon film by a plasma CVD method, plasma was discharged under the following condition. A source gas in which the flow rate of silane was 8 sccm, the flow rate of hydrogen was 800 sccm, and the flow rate of 5 vol % phosphine (diluted with hydrogen) was 24 sccm was introduced into a reaction chamber, and the pressure of the reaction chamber was set to 200 Pa. The temperature of a substrate was set to 250° C. The RF power source frequency was set to 60 MHz, and power of the RF power source was 180 W.

The positive electrode active material of Sample 3 was polycrystalline silicon. The polycrystalline silicon was formed by a method in which an amorphous silicon film formed in a manner similar to that of Sample 1 was crystallized at a temperature lower than or equal to a melting point of silicon. The crystallization here was performed by a thermal crystallization method in which only argon was introduced into a reaction chamber and heating at 700° C. was performed for six hours.

As described above, the positive electrode active material layers were formed over the respective positive electrode current collectors. With use of the thus formed positive electrodes, coin secondary batteries were manufactured. Here, a method for manufacturing a coin secondary battery is briefly described with reference to FIG. 9. Note that in a positive electrode 204, a positive electrode active material layer 202 is provided over a current collector 200, and the positive electrode 204 corresponds to any one of the above-described Samples 1 to 3.

Figure 9:
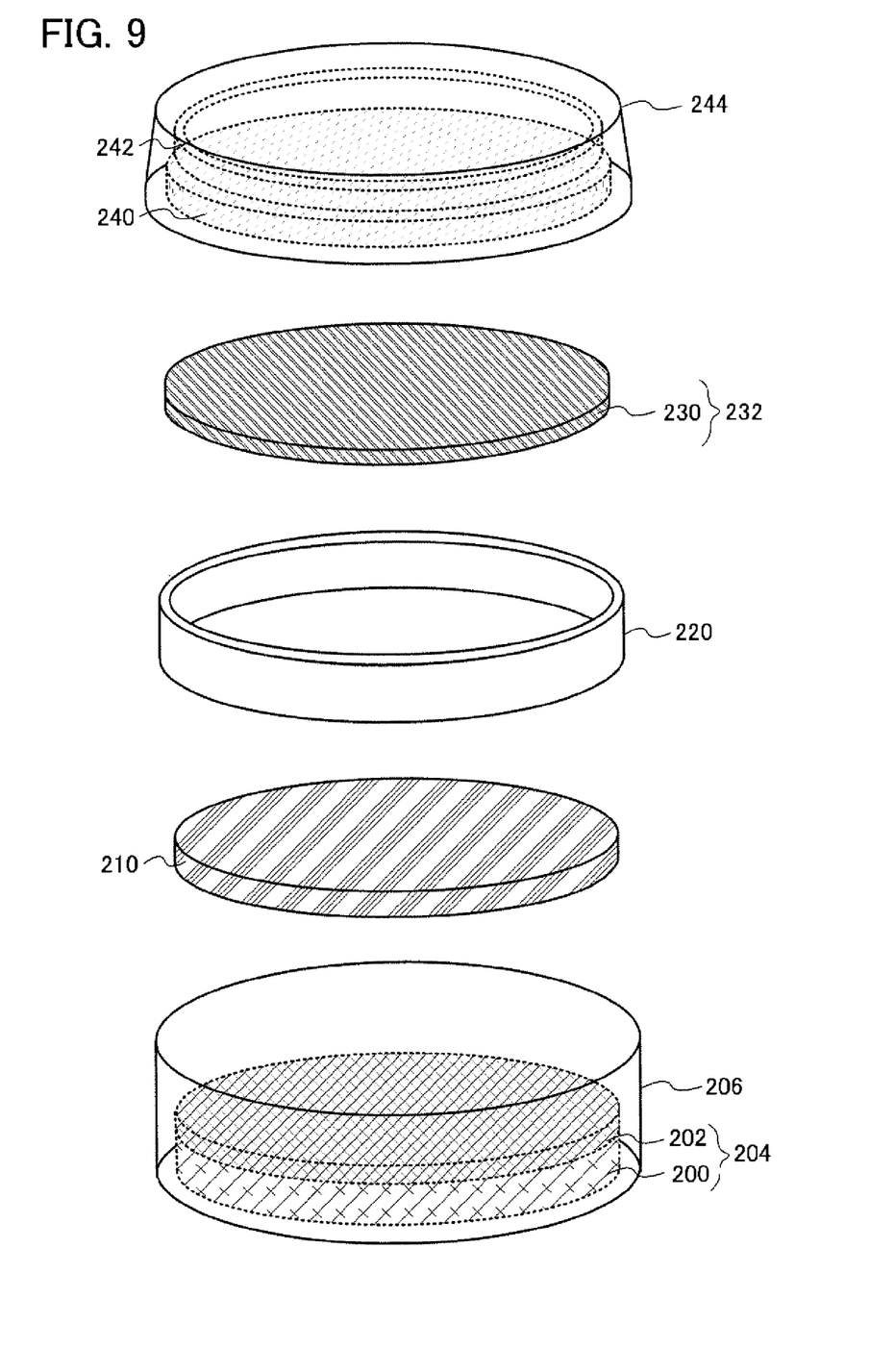
FIG. 9 illustrates an example of a manufacturing method of an electrode of a coin secondary battery according to one embodiment of the present invention.

As a negative electrode 232, a ring-shaped insulator 220, and a separator 210 which are components in a cell of a coin lithium ion secondary battery, commercially available products were used. In the negative electrode 232, a negative electrode active material layer 230 was formed using lithium foil. Polypropylene was used for a separator 210. The positive electrode 204, the negative electrode 232, and the separator 210 were impregnated with an electrolyte solution. Commercially available housings were used for a housing 206 and a housing 244 with which the positive electrode 204 and the negative electrode 232 are electrically connected to the external. A specific material of the housing 206 and the housing 244 is stainless steel (SUS). In addition, a spacer 240 and a washer 242 each formed using stainless steel (SUS) were prepared, which were also commercially available products.

The positive electrode 204, the negative electrode 232, and the separator 210 were impregnated with an electrolyte solution. As illustrated in FIG. 9, the housing 206, the positive electrode 204, the separator 210, the ring-shaped insulator 220, the negative electrode 232, the spacer 240, the washer 242, and the housing 244 were stacked in this order so that the housing 206 was positioned at the bottom of the stacked components. The housing 206 and the housing 244 were pressed and bonded to each other with a "coin cell crimper". In such a manner, the cell of the coin lithium ion secondary battery was manufactured.

As the electrolyte solution, a solution in which $LiPF_6$ is dissolved in a mixed solvent of EC and DEC was used.

Figure 4:
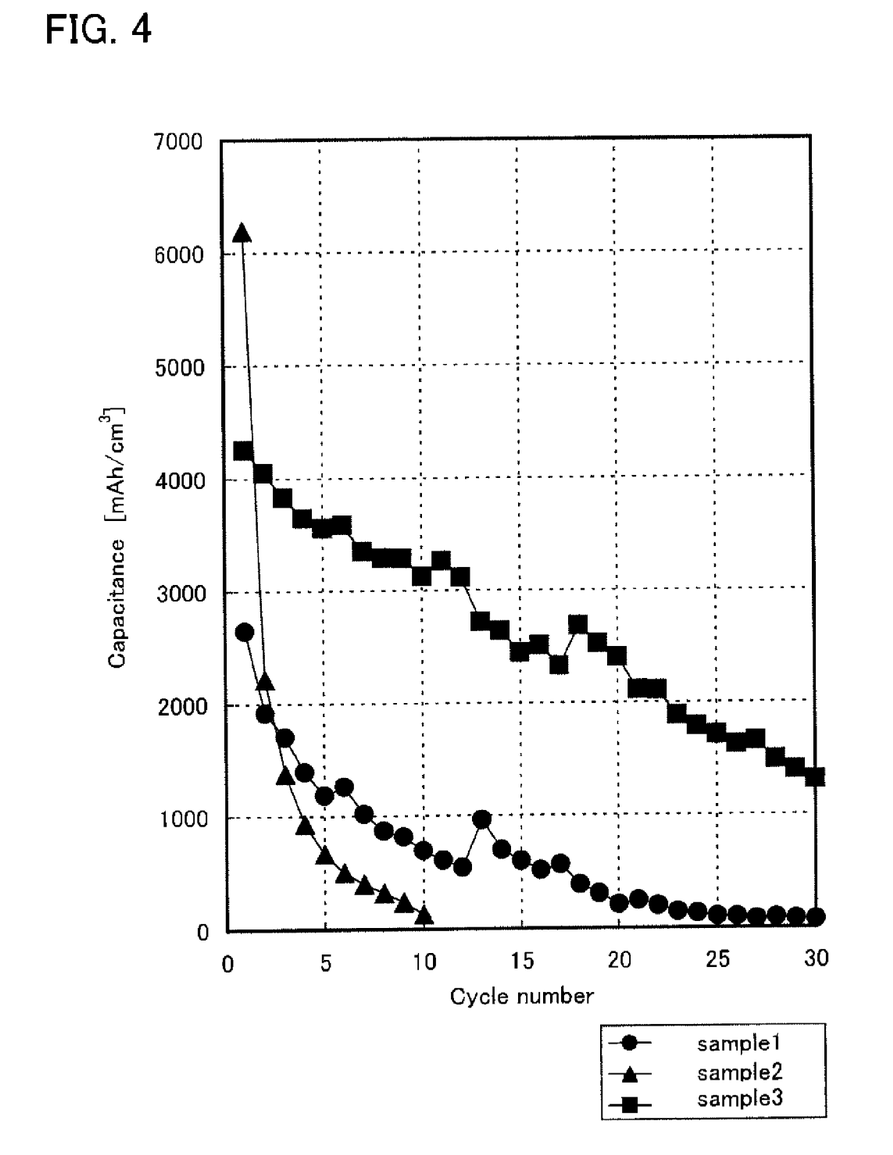
FIG. 4 is a first graph showing comparison of charge-discharge cycle characteristics.

FIG. 4 shows the results of the Samples 1 to 3 which were charged and discharged repeatedly. The charge-discharge characteristics were measured with a charge-discharge measuring device. A constant current system was applied to the measurement of charge and discharge. Current of 2.0 mA flowed at a rate of about 0.2 C for charge and discharge. The upper limit voltage was 1.0 V, and the lower limit voltage was 0.03 V. All samples were measured at room temperature.

In comparison among Samples 1 to 3 in FIG. 4, it is found that the charge-discharge characteristics of Sample 3 have less deterioration than those of Samples 1 and 2. According to the results, in one embodiment of the present invention, the most preferable silicon film functioning as a positive electrode active material layer was a polycrystalline silicon film, and use of the microcrystalline silicon film resulted in the poorest charge-discharge cycle characteristics.

Figure 5:
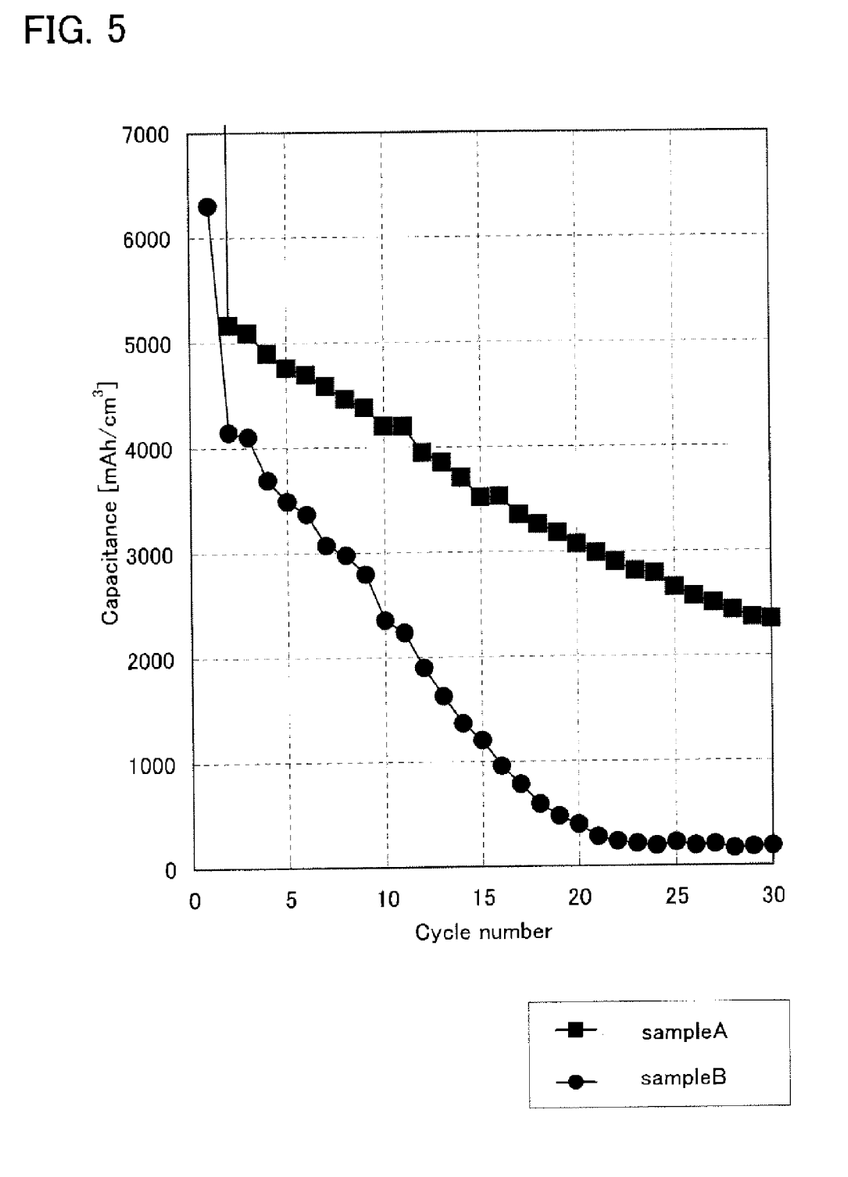
FIG. 5 is a second graph showing comparison of charge-discharge cycle characteristics.

Next, Sample A and Sample B were formed and charged and discharged repeatedly. FIG. 5 shows the results of the charge and discharge. In Sample A, a positive electrode active material (amorphous silicon) was formed in a manner similar to that of Sample 1 except for the temperature of a substrate. Here, the substrate temperature in formation of the positive electrode active material was 500° C. In Sample B, a positive electrode active material (amorphous silicon) was formed at a substrate temperature of 280° C., which is equivalent to that of Sample 1. In both Sample A and Sample B, the thickness of the silicon film which was the positive electrode active material was set to 1 μm. That is, between Sample 1 and Sample B, the formation conditions of the positive electrode active material are equivalent to each other, but only a thickness of the positive electrode active material layer is different. The charge-discharge characteristics were measured with a charge-discharge measuring device. A constant current system was applied to the measurement of charge and discharge. Current of 1.5 mA flowed for charge and discharge. The upper limit voltage was 1.0 V, and the lower limit voltage was 0.03 V. All samples were measured at room temperature.

According to the results in FIG. 5, the charge-discharge cycle characteristics of Sample A are higher (i.e., less likely to deteriorate) than those of Sample B and are drastically improved as compared to those of Sample B (Sample 1). Therefore, as the temperature of a substrate in formation of silicon that is the positive electrode active material, 500° C. is preferable to 280° C.

Figure 6:
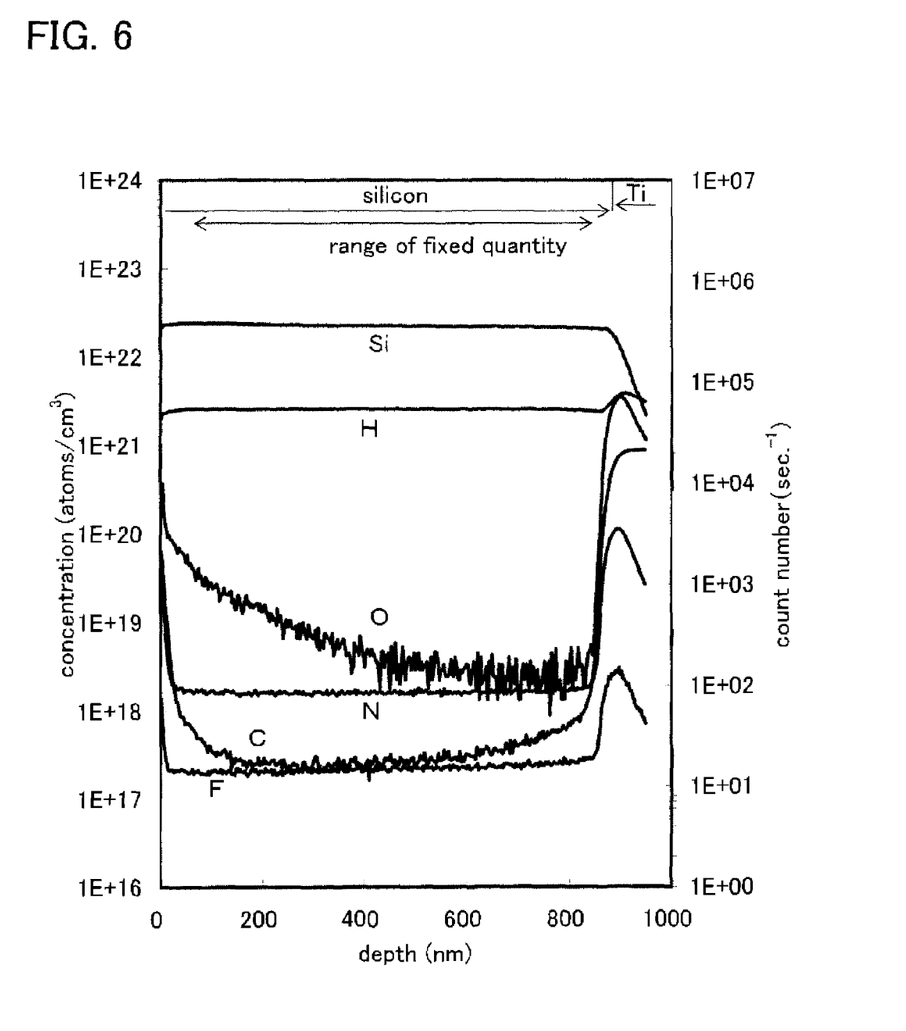
FIG. 6 is a first graph showing results of SIMS analysis of Sample 1 in Example 1.
Figure 7:
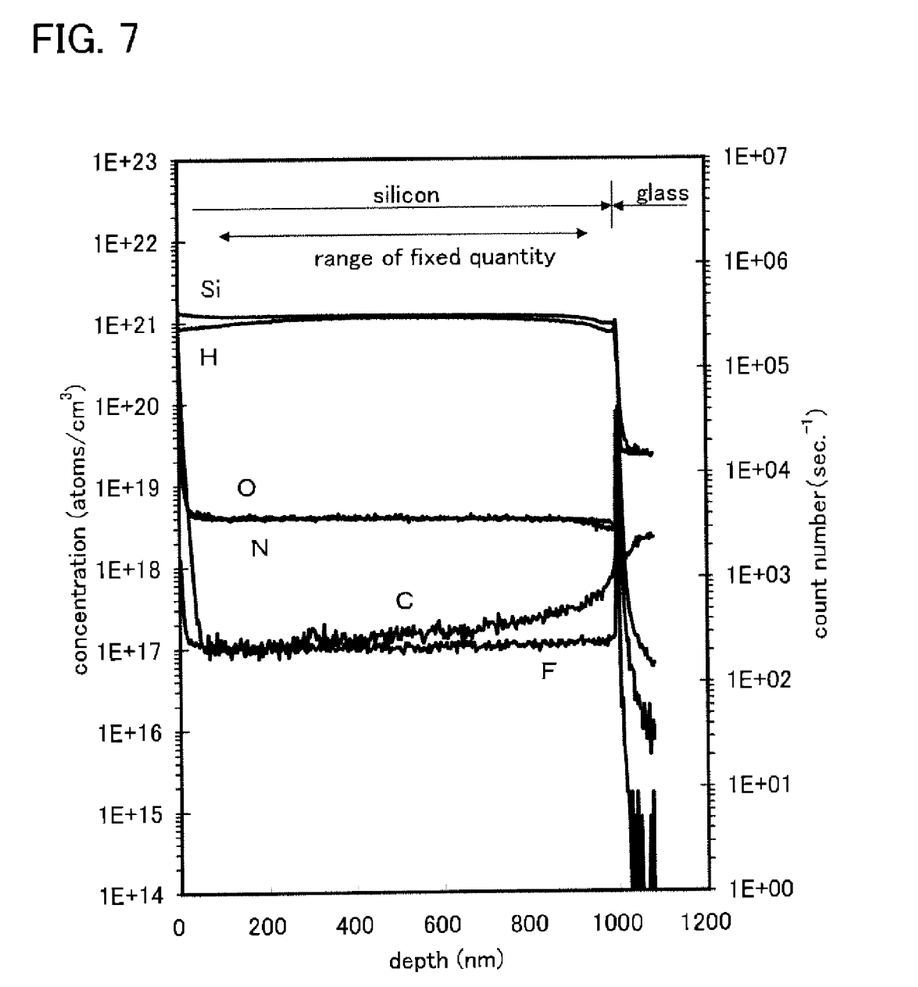
FIG. 7 is a second graph showing results of SIMS analysis of Sample A in Example 1.
Figure 8:
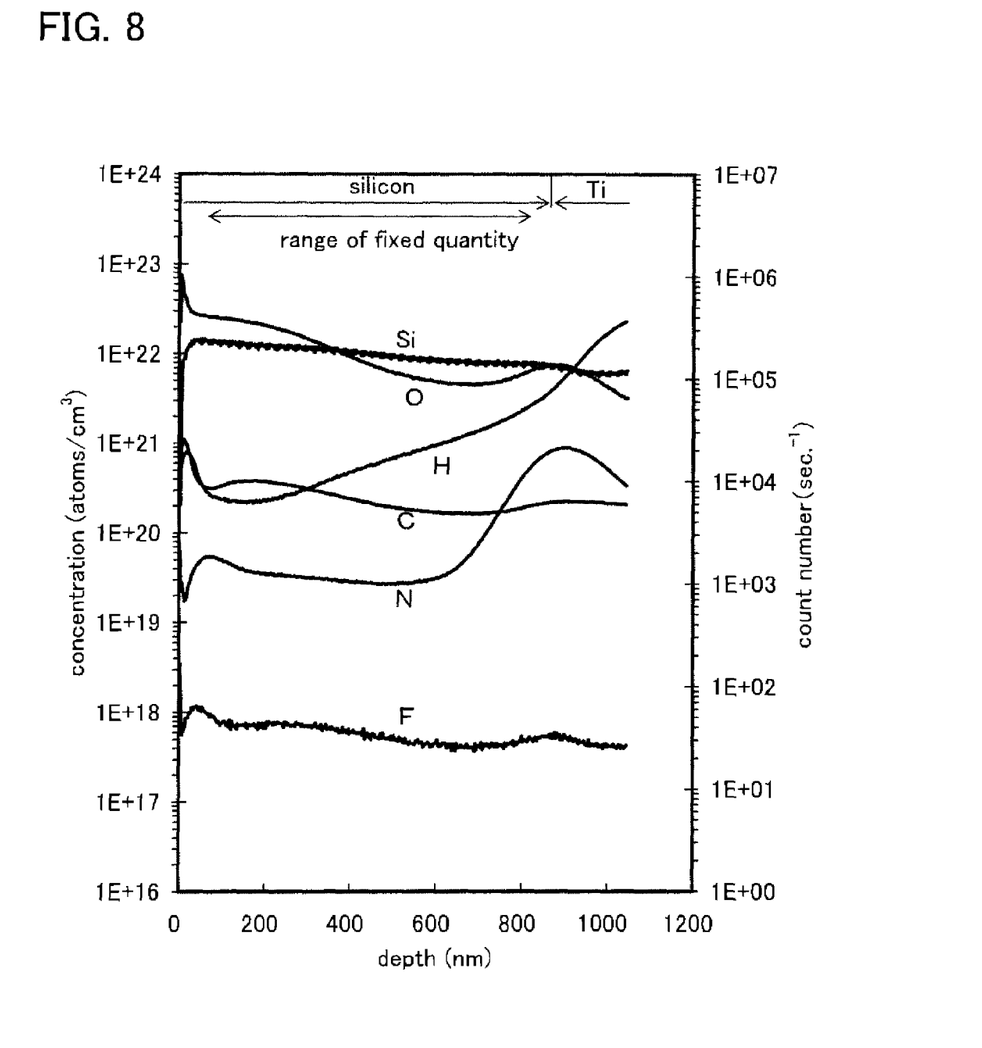
FIG. 8 is a third graph showing results of SIMS analysis of Sample 3 in Example 1.

FIG. 6 and FIG. 7 show results of SIMS analysis of Sample 1 (which has a difference only in the thickness from Sample B) and Sample A, respectively. Further, FIG. 8 shows results of SIMS analysis of Sample 3 whose cycle characteristics are most favorable (less likely to deteriorate) according to FIG. 4. Note that only in Sample A, a glass substrate was used and titanium which is a positive electrode current collector was not provided.

As shown in FIG. 4, Sample 2 whose positive electrode active material layer was formed using microcrystalline silicon did not have favorable cycle characteristics (the cycle characteristics easily deteriorated). The conceivable reason is that in Sample 2, since the positive electrode active material layer was formed using microcrystalline silicon, a large amount of hydrogen entered the silicon film in formation thereof.

In Sample 1, the hydrogen concentration is higher than or equal to $2.5 \times 10^{21}$ cm$^{-3}$ and lower than or equal to $2.6 \times 10^{21}$ cm$^{-3}$. In Sample 3, the hydrogen concentration is higher than or equal to $2.2 \times 10^{20}$ cm$^{-3}$ and lower than or equal to $1.0 \times 10^{21}$ cm$^{-3}$. In Sample A, the hydrogen concentration is higher than or equal to $9.5 \times 10^{20}$ cm$^{-3}$ and lower than or equal to $1.2 \times 10^{21}$ cm$^{-3}$.

According to the above results, by a reduction in hydrogen in the silicon film used as a positive electrode active material, charge-discharge cycle characteristics can be improved. For example, as described in this example, when the substrate is heated to 500° C. and maintained at the temperature and the silicon film is formed, the hydrogen concentration can be higher than or equal to $9.5 \times 10^{20}$ cm$^{-3}$ and lower than or equal to $1.2 \times 10^{21}$ cm$^{-3}$. A reduction in hydrogen in the vicinity of a surface of the silicon film used as the positive electrode active material is particularly effective.

This application is based on Japanese Patent Application serial no. 2010-073345 filed with Japan Patent Office on Mar. 26, 2010, the entire contents of which are hereby incorporated by reference.

EXPLANATION OF REFERENCE

100: cross section, 102: battery cover, 104: battery sidewall, 106: battery bottom, 110: electrode boy, 112: insulating plate, 114: insulating plate, 116: resistor, 118: gasket, 120: conductive wire, 122: negative electrode, 124: separator. 126: positive electrode, 128: conductive wire, 130: substrate, 132: current collector layer, 134: active material layer, 136: mixed layer, 138: lithium-containing layer, 200: current collector, 202: positive electrode active material layer, 204: positive electrode, 206: housing, 210: separator. 220: ring-shaped insulator, 230: negative electrode active material layer, 232: negative electrode, 240: spacer, 242: washer, 244: housing

The invention claimed is:

1. A secondary battery comprising an electrode comprising a silicon film,
    wherein the silicon film comprises polycrystalline silicon, and
    wherein a concentration of hydrogen included in the silicon film is higher than or equal to $1.0 \times 10^{18}$ cm$^{-3}$ and lower than or equal to $1.0 \times 10^{21}$ cm$^{-3}$.

2. The secondary battery according to claim 1, wherein the silicon comprises phosphorus.

3. A secondary battery comprising:
    a first electrode comprising a current collector and a silicon film provided over the current collector;
    a second electrode; and
    a separator provided between the first electrode and the second electrode,
    wherein the silicon film comprises polycrystalline silicon, and
    wherein a concentration of hydrogen included in the silicon film is higher than or equal to $1.0 \times 10^{18}$ cm$^{-3}$ and lower than or equal to $1.0 \times 10^{21}$ cm$^{-3}$.

4. The secondary battery according to claim 3, wherein the silicon film comprises phosphorus.

5. The secondary battery according to claim 3, wherein the current collector comprises titanium.

6. The secondary battery according to claim 3, wherein the second electrode comprises alkali metal.

7. The secondary battery according to claim 3, wherein the second electrode comprises lithium.

8. The secondary battery according to claim 3, wherein the second electrode comprises metal having higher oxidation-reduction potential than silicon.

9. The secondary battery according to claim 3, further comprising a mixed layer between the current collector and the silicon film.

10. The secondary battery according to claim 9, wherein the mixed layer comprises titanium and silicon.

11. The secondary battery according to claim 9, wherein the mixed layer comprises a titanium silicide.

12. A method for manufacturing an electrode of a secondary battery, comprising the steps of:
    forming a current collector over a substrate; and
    forming a silicon film over the current collector,
    wherein the substrate is heated at a temperature higher than or equal to 500° C. and a temperature at which composition and a shape of the current collector are not changed during formation of the silicon film, and
    wherein a concentration of hydrogen included in the silicon film is higher than or equal to $1.0 \times 10^{18}$ cm$^{-3}$ and lower than or equal to $1.0 \times 10^{21}$ cm$^{-3}$.

13. The method for manufacturing an electrode of a secondary battery according to claim 12, wherein the silicon film comprises polycrystalline silicon.

14. The method for manufacturing an electrode of a secondary battery according to claim 13, wherein the polycrystalline silicon is formed by a thermal crystallization method.

* * * * *

UNITED STATES PATENT AND TRADEMARK OFFICE
CERTIFICATE OF CORRECTION

PATENT NO.        : 8,623,550 B2                                     Page 1 of 1
APPLICATION NO.   : 13/044172
DATED             : January 7, 2014
INVENTOR(S)       : Kuriki et al.

It is certified that error appears in the above-identified patent and that said Letters Patent is hereby corrected as shown below:

In the Claims:

Claim 2, Col. 10, line 18, "silicon comprises phosphorus." should read --silicon film comprises phosphorus.--

Signed and Sealed this
Twentieth Day of May, 2014

Michelle K. Lee
*Deputy Director of the United States Patent and Trademark Office*